United States Patent
Takeuchi et al.

(10) Patent No.: US 11,104,769 B2
(45) Date of Patent: Aug. 31, 2021

(54) PULTRUDED MATERIAL AND METHOD FOR MANUFACTURING PULTRUDED MATERIAL

(71) Applicant: MITSUBISHI HEAVY INDUSTRIES, LTD., Tokyo (JP)

(72) Inventors: Yukio Takeuchi, Tokyo (JP); Kosuke Ikeda, Tokyo (JP); Wataru Nishimura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 123 days.

(21) Appl. No.: 16/704,628

(22) Filed: Dec. 5, 2019

(65) Prior Publication Data

US 2020/0181339 A1 Jun. 11, 2020

(30) Foreign Application Priority Data

Dec. 7, 2018 (JP) .............................. JP2018-230426

(51) Int. Cl.
*C08J 5/10* (2006.01)
*C08J 5/04* (2006.01)
*B29C 70/52* (2006.01)
*C08K 3/36* (2006.01)
*C08K 5/00* (2006.01)
*C08K 5/14* (2006.01)

(52) U.S. Cl.
CPC .............. *C08J 5/042* (2013.01); *B29C 70/521* (2013.01); *C08J 2333/08* (2013.01); *C08J 2363/00* (2013.01); *C08J 2367/00* (2013.01); *C08K 3/36* (2013.01); *C08K 5/0025* (2013.01); *C08K 5/0066* (2013.01); *C08K 5/14* (2013.01)

(58) Field of Classification Search
CPC ........ C08J 5/042; C08J 5/043; C08J 2333/08; C08J 2363/00; C08J 2300/24; C08J 5/10; C08K 3/36; C08K 5/0025; C08K 5/14; C08K 5/0066; C08K 2201/011; C08K 5/10; B29C 70/521; B29K 2995/0016
USPC ......................................................... 524/496
See application file for complete search history.

(56) References Cited

U.S. PATENT DOCUMENTS

| | | | | |
|---|---|---|---|---|
| 2012/0214002 A1* | 8/2012 | Kasahara | ............... | C09J 163/00 428/414 |
| 2015/0065606 A1* | 3/2015 | Matsuda | ................. | C08L 63/00 523/201 |
| 2019/0217558 A1* | 7/2019 | Morishima | ............. | B29C 70/06 |
| 2020/0282672 A1* | 9/2020 | Morishima | ............. | C08J 5/042 |

FOREIGN PATENT DOCUMENTS

| | | |
|---|---|---|
| JP | 2005-226014 A | 8/2005 |
| JP | 2008-038082 A | 2/2008 |

* cited by examiner

*Primary Examiner* — Hannah J Pak
(74) *Attorney, Agent, or Firm* — Osha Bergman Watanabe & Burton LLP

(57) ABSTRACT

A pultruded material includes a thermosetting resin, and a reinforced fibers impregnated with the thermosetting resin. The thermosetting resin includes a solid resin that contains a fire-resistant resin having a median oxygen index of equal to or higher than, a long-chain fatty acid ester that has a median number of carbons per molecule within a range equal to or more than 3 and equal to or less than 1000, and that has a median flash point within a range equal to or higher than 150 degrees Celsius, and an additive that has a median BET specific surface area within a range equal to or more than 150 m²/g and equal to or less than 250 m²/g, and that has a median primary particle diameter within a range equal to or more than 5 nanometers and equal to or smaller than 20 nanometers.

10 Claims, 3 Drawing Sheets

PULTRUDED MATERIAL AND METHOD FOR MANUFACTURING PULTRUDED MATERIAL

CROSS-REFERENCE TO RELATED APPLICATIONS

The present application claims priority to and incorporates by reference the entire contents of Japanese Patent Application No. 2018-230426 filed in Japan on Dec. 7, 2018.

FIELD

The present invention relates to a pultruded material and a method for manufacturing a pultruded material.

BACKGROUND

An example of a light-weighted, and highly strong material is a composite material achieved by impregnating reinforced fibers with a thermosetting resin. Composite materials are used in air crafts, automobiles, and ships, for example. Known as a method for forming such composite materials is pultruding a base material of the composite material. There has also been a known method for changing the composition of the thermosetting resin used as the base material of the composite material depending on the internal quality, the strength properties, and the like of the pultruded material that serves as the base material of the composite material (see Patent Literature 1 and Patent Literature 2, for example).

CITATION LIST

Patent Literature

Patent Literature 1: Japanese Patent Application Laid-open No. 2005-226014
Patent Literature 2: Japanese Patent Application Laid-open No. 2008-038082

SUMMARY

Technical Problem

With methods using a thermosetting resin having a conventional composition, including those disclosed in Patent Literature 1 and Patent Literature 2, it has been quite difficult to form a composite material achieving a recent fire resistance requirement level, via a pultrusion. Specifically, when a fire-resistant resin is contained in the thermosetting resin so that the fire resistance requirement is satisfied, the thermosetting resin becomes highly viscous, and it becomes difficult to impregnate, particularly, reinforced fibers with the thermosetting resin. Therefore, it has been difficult to form a composite material achieving a conventional rigidity level and cost level, via a pultrusion, which forms the composite material by pulling the material continuously, without taking sufficient time for the impregnation.

The present invention is made in consideration of the above, and an object of the present invention is to provide a pultruded material containing a fire-resistant resin and achieving a sufficient rigidity level and cost level, and a method for manufacturing such a pultruded material.

Solution to Problem

To solve the problems described above and achieve the object, a pultruded material includes a thermosetting resin; and a reinforced fiber that is impregnated with the thermosetting resin. The thermosetting resin includes a solid resin that contains a fire-resistant resin having a median oxygen index of equal to or higher than 26, a long-chain fatty acid ester that has a median number of carbons per molecule within a range equal to or more than 3 and equal to or less than 1000, and that has a median flash point within a range equal to or higher than 150 degrees Celsius, and an additive that has a median BET specific surface area within a range equal to or more than 150 $m^2/g$ and equal to or less than 250 $m^2/g$, and that has a median primary particle diameter within a range equal to or more than 5 nanometers and equal to or smaller than 20 nanometers.

With this configuration, because the long-chain fatty acid ester functions as a release agent giving releasability from a pultrusion die to the solid resin, as a void reducing agent for reducing voids, taking advantage of the low volatility of the long-chain fatty acid ester, and as a viscosity depressant for reducing the viscosity of the solid resin, and the additive functions as a thixotrope giving thixotropy to the solid resin, a pultruded material containing a fire-resistant resin and achieving a sufficient rigidity level and cost level can be obtained.

In this configuration, the thermosetting resin preferably contains, on the basis of the total mass (100 mass %) of the solid resin, the fire-resistant resin of 20 mass % or more and 70 mass % or less. With this configuration, even when a pultruded material is manufactured by impregnating and pultruding the reinforced fibers with the thermosetting resin containing the fire-resistant resin at a high percentage, because the functions of the long-chain fatty acid ester as a release agent, a void reducing agent, and a viscosity depressant, and the function of the additive as a thixotrope are exerted, a pultruded material containing a fire-resistant resin and further achieving a sufficient rigidity level and cost level can be obtained.

In this configuration, the thermosetting resin preferably contains, on the basis of the total mass (100 mass %) of the solid resin, the long-chain fatty acid ester of 0.5 mass % or more and 10.0 mass % or less. With this configuration, because the functions of the long-chain fatty acid ester as a release agent, a void reducing agent, and a viscosity depressant are exerted more effectively in the manufacturing process in which the reinforced fibers are impregnated and pultruded with the thermosetting resin containing a fire-resistant resin. Therefore, a pultruded material containing a fire-resistant resin and further achieving a sufficient rigidity level and cost level can be obtained.

In this configuration, the thermosetting resin preferably contains, on the basis of the total mass (100 mass %) of the solid resin, the additive of 0.01 mass % or more and 2.00 mass % or less. With this configuration, because the function of the additive as a thixotrope is exerted more effectively in the manufacturing process in which the reinforced fibers are impregnated and pultruded with the thermosetting resin containing a fire-resistant resin, a pultruded material containing a fire-resistant resin and further achieving a sufficient rigidity level and cost level can be obtained.

In this configuration, silica-based powder is preferably used as the additive. With this configuration, because the function of the additive as a thixotrope is exerted more effectively in the manufacturing process in which the reinforced fibers are impregnated and pultruded with the thermosetting resin containing a fire-resistant resin, a pultruded material containing a fire-resistant resin and further achieving a sufficient rigidity level and cost level can be obtained.

In this configuration, the reinforced fiber is preferably a carbon fiber, and forms a large tow that is a bundle of 30000 or more carbon fibers. With this configuration, even when a pultruded material is manufactured by impregnating and pultruding large tow carbon fibers that are difficult to be impregnated with a fire-resistant resin, with the thermosetting resin containing the fire-resistant resin, because the functions of the long-chain fatty acid ester as a release agent, a void reducing agent, and a viscosity depressant, and the function of the additive as a thixotrope are exerted, it is possible to obtain a pultruded material containing a fire-resistant resin and further achieving a sufficient rigidity level and cost level, which are satisfied by the large tow carbon fibers.

To solve the problems described above and achieve the object, a method for manufacturing a pultruded material resultant of impregnating a reinforced fiber with a thermosetting resin includes preparing the thermosetting resin; impregnating the reinforced fiber with the thermosetting resin; and pultruding, using a pultrusion die, the reinforced fiber impregnated with the thermosetting resin in a direction in which the reinforced fiber stretches to form a pultruded material. The prepared thermosetting resin includes a solid resin that contains a fire-resistant resin having a median oxygen index of equal to or higher than 26, a long-chain fatty acid ester that has a median number of carbons per molecule within a range equal to or more than 3 and equal to or less than 1000, that has a median flash point within a range equal to or higher than 150 degrees Celsius, and that serves as a release agent that gives releasability from the pultrusion die to the solid resin, an additive that has a median BET specific surface area within a range equal to or more than 150 $m^2/g$ and equal to or less than 250 $m^2/g$, that has a median primary particle diameter within a range equal to or more than 5 nanometers and equal to or smaller than 20 nanometers, and that serves as a thixotrope that gives thixotropy to the solid resin, and a peroxide curing agent that has a median molecular weight within a range equal to or more than 170 and equal to or less than 10000, and that promotes a thermal curing reaction of the solid resin.

With this configuration, because the long-chain fatty acid ester functions as a release agent giving releasability from the pultrusion die to the solid resin, as a void reducing agent for reducing voids, taking advantage of the low volatility of the long-chain fatty acid ester, and as a viscosity depressant for reducing the viscosity of the solid resin, because the additive functions as a thixotrope giving thixotropy to the solid resin, because the thermal curing reaction of the solid resin is obstructed due to the long-chain fatty acid ester and the additive added thereto, and because the peroxide curing agent functions as a promoter of a thermal curing reaction of the solid resin, the speed of the thermal curing reaction is brought to an appropriate range. Therefore, a pultruded material containing a fire-resistant resin and achieving a sufficient rigidity level and cost level can be obtained.

In this configuration, the thermosetting resin preferably contains, on the basis of the total mass (100 mass %) of the solid resin, the peroxide curing agent of 0.5 mass % or more and 5.0 mass % or less. With this configuration, because the peroxide curing agent functions as a promoter of a thermal curing reaction of the solid resin in the manufacturing process in which the reinforced fibers are impregnated and pultruded with the thermosetting resin containing a fire-resistant resin, while the thermal curing reaction of the solid resin is obstructed due to the long-chain fatty acid ester and the additive added thereto, the speed of the thermal curing reaction is brought to an appropriate range. Therefore, a pultruded material containing a fire-resistant resin and achieving a sufficient rigidity level and cost level can be obtained.

In this configuration, a diacyl peroxide organic compound is preferably used as the peroxide curing agent. With this configuration, because the peroxide curing agent functions as a promoter of a thermal curing reaction of the solid resin in the manufacturing process in which the reinforced fibers are impregnated and pultruded with the thermosetting resin containing a fire-resistant resin, while the thermal curing reaction of the solid resin is obstructed due to the long-chain fatty acid ester and the additive added thereto, the speed of the thermal curing reaction is brought to an appropriate range. Therefore, a pultruded material containing a fire-resistant resin and achieving a sufficient rigidity level and cost level can be obtained.

In this configuration, the pultruding preferably includes heating the pultrusion die using a heat source capable of keeping a temperature constant. With this configuration, because the solid resin is thermally cured while the temperature of the pultrusion die is maintained, a pultruded material containing a fire-resistant resin and further achieving a sufficient rigidity level and cost level can be obtained.

DESCRIPTION OF EMBODIMENTS

An embodiment according to the present invention will now be explained in detail with reference to the drawings. The embodiment is, however, not intended to limit the scope of the present invention in any way. The elements described in the embodiment include those that are replaceable, those that can be easily thought of by those skilled in the art, and those that are substantially the same. The elements described below may be combined as appropriate.

EMBODIMENT

Figure 1:
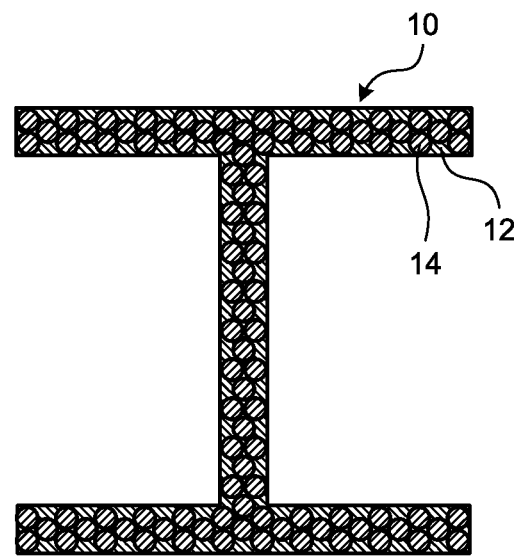
FIG. 1 is a schematic sectional view illustrating one example of a pultruded material according to an embodiment of the present invention.
Figure 1:
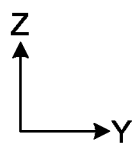

FIG. 1 is a schematic configuration diagram illustrating one example of a pultruded material 10 according to the embodiment of the present invention. The pultruded material 10 is pultruded in a longitudinal direction that is a direction perpendicularly intersecting with a YZ plane illustrated in FIG. 1, and has a shape extending in the longitudinal direction. The pultruded material 10 has a predetermined shape on the YZ plane illustrated in FIG. 1, that is, on a plane perpendicularly intersecting with the longitudinal direction. In this embodiment, the pultruded material 10 has a T-shape, but the present invention is not limited thereto, and may have any shape such as an I-shape, an H-shape, a U-shape, or a cylindrical shape.

The pultruded material 10 is a composite material containing a fire-resistant resin, and includes a thermosetting resin 12 that contains the fire-resistant resin, and reinforced fibers 14 that are impregnated with the thermosetting resin 12, and that extend in the longitudinal direction, as illustrated in FIG. 1. The pultruded material 10 satisfies a fire resistance level, because the fire-resistant resin is contained in the thermosetting resin 12.

The thermosetting resin 12 is resultant of impregnating reinforced fibers 13 (see FIG. 2) that are used as a raw material corresponding to the reinforced fibers 14 in the method for manufacturing a pultruded material for manufacturing the pultruded material 10, with a thermosetting resin 11 (see FIG. 2) that is also used as a raw material in the pultruded material manufacturing method for manufacturing the pultruded material 10, and by allowing thermal curing to take place.

Described in this embodiment is an example in which the reinforced fibers 13 is a unidirectional material extending in the longitudinal direction, but the present invention is not limited thereto, and the reinforced fibers 13 may extend in any direction other than the longitudinal direction, or may include reinforced fibers 13 extending in a first direction and reinforced fibers 13 extending in a second direction that is different from the first direction.

A thermosetting resin can take a softened state, a cured state, and a semi-cured state. The softened state is a state before the thermosetting resin is thermally cured. The softened state is a state in which the thermosetting resin is not self-supporting, and is not capable of maintaining its shape without the support of some support body. The softened state is a state in which the thermosetting resin can go through a thermal curing reaction by being heated. The cured state is a state in which the thermosetting resin has become thermally cured. The cured state is a state in which the thermosetting resin is self-supporting, and is capable of maintaining its shape without the support of any support body. The cured state is a state in which thermosetting resin cannot go through a thermal curing reaction even by being heated. The semi-cured state is a state between the softened state and the cured state. The semi-cured state is a state in which the thermosetting resin has been thermally cured to a degree less than the degree that the thermosetting resin in the cured state has gone through. The semi-cured state is a state in which the thermosetting resin is self-supporting, and is capable of maintaining its shape without the support of any support body. The semi-cured state is a state in which the thermosetting resin can go through a thermal curing reaction by being heated. The thermosetting resin 11 used as a raw material in the pultruded material manufacturing method for manufacturing the pultruded material 10 is in the softened state or in a moderate semi-cured state. The thermosetting resin 12 contained in the manufactured pultruded material 10 is the thermosetting resin 11 having gone through a thermal curing reaction, and is in a cured state or a semi-cured state that is almost in the cured state.

The thermosetting resin 11 contains a solid resin that is a main agent, a release agent that gives releasability from a pultrusion die 26 (see FIG. 2) to the solid resin, an additive that is a thixotrope that gives thixotropy to the solid resin, and a peroxide curing agent that promotes a thermal curing reaction of the solid resin.

The solid resin included in the thermosetting resin 11 is a radically polymerizable compound, and contains a fire-resistant resin having a median oxygen index of equal to or higher than 26. On the basis of the total mass (100 mass %) of the fire-resistant resin contained in the solid resin included in the thermosetting resin 11, it is preferable for 90 mass % or more to have an oxygen index of equal to or higher than 26, and on the basis of the total mass (100% mass) of the fire-resistant resin, it is more preferable for 95 mass % or more to have an oxygen index within a range equal to or higher than 26. The oxygen index herein is the minimum oxygen concentration [unit: volume %] required to sustain a combustion of the material, and specifically, is the minimum oxygen concentration required to sustain a combustion of the material for a time period equal to or longer than 180 seconds, or to sustain a combustion of the material for a length of 50 millimeters or more after the flame is brought into contact with the material. In other words, the fire-resistant resin according to the embodiment is a resin material not capable of sustaining a combustion unless the resin material is put in an environment where the oxygen concentration is higher than 21% that is the oxygen concentration of the air, by approximately 5% or more. Therefore, the thermosetting resin 12, which is achieved by impregnating the reinforced fibers 13 with the thermosetting resin 11 and allowing a thermal curing reaction to take place, can achieve a desired level of fire resistance.

It is also preferable, on the basis of the total mass (100 mass %) of the solid resin, for the thermosetting resin 11 to contain the fire-resistant resin of 20 mass or more and 70 mass % or less. With this composition, the thermosetting resin 12, which is achieved by impregnating the reinforced fibers 13 with the thermosetting resin 11 and allowing a thermal curing reaction to take place, can achieve an even higher level of fire resistance. Even with the thermosetting resin 11 containing the fire-resistant resin at a high percentage, that is, 20 mass % or more and 70 mass % or less, the function of the long-chain fatty acid ester as a release agent, a void reducing agent, and a viscosity depressant, which will be described later, the function of the additive as a thixotrope, which will also be described later, and the function of the peroxide curing agent as a promotor of a thermal curing reaction, which will be described later, are exerted in the manufacturing process in which the reinforced fibers 13 are impregnated and pultruded with the thermosetting resin 11 containing the fire-resistant resin. Therefore, a pultruded material 10 containing a fire-resistant resin and achieving a sufficient rigidity level and cost level can be obtained.

As specific examples of the radically polymerizable compounds used in the solid resin included in the thermosetting resin 11, other than the fire-resistant resin, derivatives of bisphenol A, bisphenol F, and the like, epoxy acrylate (vinyl ester), isophthalic unsaturated polyester, orthophthalic unsaturated polyester, and other radically polymerizable substances may be preferably used.

As specific examples of the fire-resistant resin, among the radically polymerizable compounds used in the solid resin for the thermosetting resin 11, brominated epoxy, brominated unsaturated polyester, and brominated vinyl ester may be used.

The release agent in the thermosetting resin 11 contains a long-chain fatty acid ester having a median number of carbons per molecule within a range equal to or more than 3 and equal to or less than 1000, and having a median flash point within a range equal to or higher than 150 degrees Celsius. Furthermore, on the basis of the total mass (100 mass %) of the long-chain fatty acid ester contained in the release agent in the thermosetting resin 11, it is preferable for 90 mass % or more to have the number of carbons per molecule within a range equal to or more than 3 and equal to or less than 1000, and, on the basis of the total mass (100 mass %) of the long-chain fatty acid ester, it is more preferable for 95 mass % or more to have the number of carbons per molecule within a range equal to or more than 3 and equal to or less than 1000. Furthermore, on the basis of the total mass (100 mass %) of the long-chain fatty acid ester contained in the release agent in the thermosetting resin 11, it is preferable for 90 mass % or more to have a flash point equal to or higher than 150 degrees Celsius, and on the basis of the total mass (100 mass %) of the long-chain fatty acid ester, it is more preferable for 95 mass % or more to have a flash point equal to or higher than 150 degrees Celsius. If some organic compound has more than 1000 carbons per molecule, or a molecular weight more than 10000, it is difficult, without limitation to the release agent, to use such an organic compound in a manner mixed with the thermosetting resin 11, due to the nature of the organic compound. Because the thermosetting resin 11 and the thermosetting resin 12 achieved by impregnating the reinforced fibers 13 with the thermosetting resin 11 and allowing a thermal curing reaction to take place have releasability from the pultrusion die 26, it is possible to suppress an excessive increase of resistance related to the pultrusion for manufacturing the pultruded material 10, and to improve the outer circumferential shape of the pultruded material 10 formed by the inner wall of the pultrusion die 26. In the manner described above, because the release agent in the thermosetting resin 11 gives the thermosetting resin 11 and the thermosetting resin 12 the releasability from the pultrusion die 26 in the manufacturing process in which the reinforced fibers 13 are impregnated and pultruded with the thermosetting resin 11 containing the fire-resistant resin, it is possible to improve the rigidity of the pultruded material 10, and to reduce the manufacturing costs of the pultruded material 10.

Because the long-chain fatty acid ester contained in the release agent in the thermosetting resin 11 has a low volatility due to its high molecular weight and high flash point, the long-chain fatty acid ester can function as a void reducing agent for reducing voids inside, in the process of letting the thermosetting resin 11 go through a thermal curing reaction, and being turned into the thermosetting resin 12. Because the release agent in the thermosetting resin 11 functions as a void reducing agent for the thermosetting resin 11 and the thermosetting resin 12, in the manufacturing process in which the reinforced fibers 13 are impregnated and pultruded with the thermosetting resin 11 containing the fire-resistant resin, in the manner described above, it is possible to improve the rigidity of the pultruded material 10, and to reduce the manufacturing costs of the pultruded material 10.

The long-chain fatty acid ester contained in the release agent in the thermosetting resin 11 exhibits a high compatibility with and a high dispersibility in the solid resin of the thermosetting resin 11, due to its high molecular weight. In other words, the long-chain fatty acid ester can be easily mixed with the solid resin in the thermosetting resin 11. Therefore, the long-chain fatty acid ester is less likely to precipitate as clots, in the process in which the thermosetting resin 12 is obtained by impregnating the reinforced fibers 13 with the thermosetting resin 11, and allowing a thermal curing reaction to take place. Hence, it is possible to improve the rigidity of the pultruded material 10, and to reduce the manufacturing costs of the pultruded material 10.

Because the long-chain fatty acid ester contained in the release agent in the thermosetting resin 11 exhibits a high compatibility with and a high dispersibility in the solid resin of the thermosetting resin 11, the long-chain fatty acid ester functions as a viscosity depressant for reducing the viscosity of the solid resin in the thermosetting resin 11. Conventionally, it has been extremely difficult to impregnate reinforced fibers with solid resin containing a fire-resistant resin, but, in the embodiment according to the present invention, because the long-chain fatty acid ester contained in the thermosetting resin 11 as a release agent also functions as a viscosity depressant, the reinforced fibers 13 can be easily impregnated, even when the reinforced fibers 13 are carbon fibers, which will be described later, that make the impregnation difficult, or bundled into a large tow, which will to be described later, that makes the impregnation even more difficult. The release agent in the thermosetting resin 11 functions as a viscosity depressant for the thermosetting resin 11 and the thermosetting resin 12, in the manufacturing process in which the reinforced fibers 13 are impregnated and pultruded with the thermosetting resin 11 containing the fire-resistant resin, in the manner described above. Therefore, it is possible to improve the rigidity of the pultruded material 10, and to reduce the manufacturing costs of the pultruded material 10.

It is preferable, on the basis of the total mass (100 mass %) of the solid resin, for the thermosetting resin 11 to contain the long-chain fatty acid ester, contained in the release agent, of 0.5 mass % or more and 10.0 mass % or less. With this composition, the long-chain fatty acid ester exerts the functions as a release agent, a void reducing agent, and a viscosity depressant more effectively, in the manufacturing process in which the reinforced fibers 13 are impregnated and pultruded with the thermosetting resin 11 containing the fire-resistant resin. Therefore, the pultruded material 10 containing a fire-resistant resin and achieving a sufficient rigidity level and cost level can be obtained. The reason why the upper bound is set to the content of the long-chain fatty acid ester contained in the release agent in the thermosetting resin 11 is that the long-chain fatty acid ester also becomes a factor that obstructs a thermal curing reaction of the solid resin.

As the long-chain fatty acid ester contained in the release agent in the thermosetting resin 11, it is preferable to use a long-chain fatty acid ester having specifications that satisfy requirements for a high molecular weight, a high flash point, and a low volatility. With such long-chain fatty acid ester, the functions of the long-chain fatty acid ester as a release agent, a void reducing agent, and a viscosity depressant are exerted more effectively in the manufacturing process in which the reinforced fibers 13 are impregnated and pultruded with the thermosetting resin 11 containing the fire-resistant resin. Hence, the pultruded material 10 containing a fire-resistant resin and achieving a sufficient rigidity level and cost level can be obtained.

Because the long-chain fatty acid ester contained in the release agent in the thermosetting resin 11 is low in volatility, as mentioned earlier, the mass percent content remains almost at the same level without changing, in the thermosetting resin 12 obtained as a result of a thermal curing reaction, as that in the thermosetting resin 11. In other words, it is preferable for the thermosetting resin 12, which is resultant of subjecting the thermosetting resin 11 to the thermal curing reaction, to contain, on the basis of the total mass (100 mass %) of the solid resin, the long-chain fatty acid ester serving as the release agent of 0.5 mass % or more and 10.0 mass % or less, in the same manner as the thermosetting resin 11. With this composition, the functions of the long-chain fatty acid ester as a release agent, a void reducing agent, and a viscosity depressant are exerted more effectively in the manufacturing process in which the reinforced fibers 13 are impregnated and pultruded with the thermosetting resin 11 containing the fire-resistant resin. Hence, the pultruded material 10 containing a fire-resistant resin and achieving a sufficient rigidity level and cost level can be obtained.

The additive contained in the thermosetting resin 11 is a thixotrope for giving thixotropy to the solid resin, and includes fine powder having a median BET specific surface area within a range equal to or more than 150 $m^2/g$ and equal to or less than 250 $m^2/g$, and having a median primary particle diameter within a range equal to or more than 5 nanometers and equal to or smaller than 20 nanometers. The BET specific surface area herein is a specific surface area contributing to adsorption, calculated based on Brunauer Emmett Teller (BET) theory. The primary particle diameter is a parameter representing a particle size obtained from this specific surface area and a density. On the basis of the total mass (100 mass %) of the additive contained in the thermosetting resin 11, it is preferable for 90 mass % or more to have a BET specific surface area equal to or more than 150 $m^2/g$ and equal to or less than 250 $m^2/g$, and on the basis of the total mass (100 mass %) of the additive, it is more preferable for 95 mass % or more to have a BET specific surface area equal to or more than 150 $m^2/g$ and equal to or less than 250 $m^2/g$. Furthermore, on the basis of the total mass (100 mass %) of the additive contained in the thermosetting resin 11, it is preferable for 90 mass % or more to have a primary particle diameter equal to or more than 5 nanometers and equal to or smaller than 20 nanometers, and on the basis of the total mass (100 mass %) of the additive, it is more preferable for 95 mass % or more to have a primary particle diameter equal to or more than 5 nanometers and equal to or smaller than 20 nanometers. Due to the large BET specific surface area and the primary particle diameter, a greater surface area of the additive in thermosetting resin 11 is brought into contact with the thermosetting resin 11, in the softened state prior to the thermal curing reaction. Therefore, a small amount of the additive can improve the thixotropy of the thermosetting resin 11 having its viscosity reduced, because of the thermosetting resin 11 containing the release agent including the long-chain fatty acid ester. Hence, it is possible to suppress dripping of the thermosetting resin 11 before the reinforced fibers 13 are impregnated with the thermosetting resin 11. In the manner described above, it is possible to improve the surface quality of the pultruded material 10, determined by the surface properties of the cured thermosetting resin 12.

It is preferable for the thermosetting resin 11 to contain, on the basis of the total mass (100 mass %) of the solid resin, the additive of 0.01 mass % or more and 2.00 mass % or less. With this composition, the function of the additive as a thixotrope is exerted more effectively in the manufacturing process in which the reinforced fibers 13 are impregnated and pultruded with the thermosetting resin 11 containing the fire-resistant resin. It is possible to suppress dripping of the thermosetting resin 11 before the reinforced fibers 13 are impregnated with the thermosetting resin 11, so that the pultruded material 10 containing a fire-resistant resin and achieving a sufficient rigidity level and cost level can be obtained. The reason why the upper bound is set to the additive content of the thermosetting resin 11 is that the additive also becomes a factor that obstructs the thermal curing reaction of the solid resin.

Because the additive contained in the thermosetting resin 11 is extremely low in volatility, the mass percent content remains almost at the same level without changing, in the thermosetting resin 12 obtained as a result of a thermal curing reaction, as that in the thermosetting resin 11. In other words, it is preferable for the thermosetting resin 12, which is resultant of subjecting the thermosetting resin 11 to the thermal curing reaction, to contain, on the basis of the total mass (100 mass %) of the solid resin, the additive of 0.01 mass % or more and 2.00 mass % or less, in the same manner as the thermosetting resin 11. With this composition, the function of the additive as a thixotrope is exerted more effectively, in the manufacturing process in which the reinforced fibers 13 are impregnated and pultruded with the thermosetting resin 11 containing the fire-resistant resin. Hence, the pultruded material 10 containing a fire-resistant resin and achieving a sufficient rigidity level and cost level can be obtained.

Silica-based powder is preferably used as the additive contained in the thermosetting resin 11. With this, because silica-based powder has a low specific gravity and the silica-based powder has a large number of hydroxyl groups on the surface, the additive exhibits a high dispersibility in the solid resin for the thermosetting resin 11. Therefore, the function of the additive as a thixotrope is exerted more effectively in the manufacturing process in which the reinforced fibers 13 are impregnated and pultruded with the thermosetting resin 11 containing the fire-resistant resin. Hence, the pultruded material 10 containing a fire-resistant resin and achieving a sufficient rigidity level and cost level can be obtained.

The peroxide curing agent contained in the thermosetting resin 11 has a median molecular weight within a range equal to or more than 170 and equal to or less than 10000, promotes a thermal curing reaction of the solid resin included in the thermosetting resin 11, and contains peroxide organic compound, that is, organic peroxide. On the basis of the total mass (100 mass %) of the peroxide curing agent contained in the thermosetting resin 11, it is preferable for 90 mass % or more to have a molecular weight equal to or more than 170 and equal to or less than 10000, and, on the basis of the total mass (100 mass %) of the peroxide curing agent, it is more preferable for 95 mass % or more to have a molecular weight equal to or more than 170 and equal to or less than 10000. More specifically, the peroxide curing agent contained in the thermosetting resin 11 is a curing agent that is fast curing in a mid-temperature range, that hardly promoting a thermal curing reaction in a low-temperature range approximately equal to or lower than 90 degrees Celsius, but rapidly goes through a reaction for promoting a thermal curing reaction upon reaching a mid-temperature range approximately equal to or higher than 90 degrees Celsius, thereby advancing the thermal curing reaction of the solid resin included in the thermosetting resin 11 rapidly, and becomes heated rapidly. Because the thermosetting resin 11 contains the long-chain fatty acid ester serving as the release agent, which also serves as a factor obstructing the thermal curing reaction of the solid resin, and the additive serving as a thixotrope, together with the peroxide curing agent contained in the thermosetting resin 11 having the properties of a fast curing agent that cures rapidly in the mid-temperature range, the speed of the thermal curing reaction of the solid resin of the thermosetting resin 11 is brought to an appropriate range, and the heating, which takes place as the thermal curing reaction takes place, is also brought to an appropriate range. Therefore, it is possible to extend the time for which the viscosity of the solid resin included in the thermosetting resin 11 is maintained at a low level appropriately, and to let the solid resin of the thermosetting resin 11 cure quickly in the mid-temperature range. As a result, the pultruded material 10 containing a fire-resistant resin and achieving a sufficient rigidity level and cost level can be obtained.

It is preferable, on the basis of the total mass (100 mass %) of the solid resin, for the thermosetting resin 11 to contain the peroxide curing agent of 0.5 mass % or more and 5.0 mass % or less. With this composition, while the thermal curing reaction of the solid resin is obstructed, due to the long-chain fatty acid ester and the additive added thereto, in the manufacturing process in which the reinforced fibers 13 are impregnated and pultruded with the thermosetting resin 11 containing the fire-resistant resin, the peroxide curing agent functions as a promoter of a thermal curing reaction of the solid resin, bringing the speed of the thermal curing reaction to an appropriate range. Hence, the pultruded material 10 containing a fire-resistant resin and achieving a sufficient rigidity level and cost level can be obtained.

Because the peroxide curing agent content of the thermosetting resin 11 changes as the thermal curing reaction takes place, there is almost no peroxide curing agent remaining in the thermosetting resin 12 obtained as a result of the thermal curing reaction. Therefore, there is almost no peroxide curing agent content in the pultruded material 10 manufactured by impregnating and pultruding the reinforced fibers 13 with the thermosetting resin 11 containing the fire-resistant resin.

A diacyl peroxide organic compound is used more preferably as the peroxide curing agent contained in the thermosetting resin 11. With this composition, too, while the thermal curing reaction of the solid resin is obstructed due to the long-chain fatty acid ester and the additive added thereto, the peroxide curing agent functions as a promoter of a thermal curing reaction of the solid resin in the manufacturing process in which the reinforced fibers 13 are impregnated and pultruded with the thermosetting resin 11 containing the fire-resistant resin, and brings the speed of the thermal curing reaction to an appropriate range. Hence, the pultruded material 10 containing a fire-resistant resin and achieving a sufficient rigidity level and cost level can be obtained.

As the peroxide curing agent used in the thermosetting resin 11, specifically, hydroperoxides, dialkyl peroxides, diacyl peroxides, peroxyesters, or ketone peroxides may be preferably used.

As a diacyl peroxide organic compound, among the peroxide curing agents used in the thermosetting resin 11, specifically, dibenzoyl peroxide, di-benzoylperoxy-hexane, or dilauroyl peroxide may be used.

In the manner described above, because the thermosetting resin 11 contains the release agent that gives the releasability from the pultrusion die 26 (see FIG. 2) to the solid resin, the additive that is a thixotrope that gives thixotropy to the solid resin, and the peroxide curing agent that promotes a thermal curing reaction of the solid resin, it is not necessary to add any antifoam or shrinkage reducing agent. Hence, the pultruded material 10 containing a fire-resistant resin and achieving a sufficient rigidity level and cost level can be obtained.

An example of the reinforced fibers 13, which are used as a raw material corresponding to the reinforced fibers 14 in the method for manufacturing a pultruded material for manufacturing the pultruded material 10, includes a bundle of several hundred to several ten thousand elementary fibers each of which is equal to or more than 5 micrometers and equal to or smaller than 10 micrometers. It is preferable for each of the elementary fibers making up the reinforced fibers 13 to be a carbon fiber. When the elementary fibers making up the reinforced fibers 13 are carbon fibers, it is possible to improve the rigidity of the pultruded material 10 achieved in the embodiment according to the present invention. However, the elementary fibers making up the reinforced fibers 13 are not limited thereto, and may be any other plastic fibers, glass fibers, or metallic fibers.

The reinforced fibers 14 are resultant of impregnating the reinforced fibers 13, which are used as a raw material in the pultruded material manufacturing method for manufacturing the pultruded material 10, with the thermosetting resin 11, which is also used as a raw material in the pultruded material manufacturing method for manufacturing the pultruded material 10, letting the thermosetting resin 11 resultant of the impregnation go through a thermal curing reaction, and to be turned into the thermosetting resin 12. Because the reinforced fibers 14 are the same as the reinforced fibers 13, except that the reinforced fibers 14 are impregnated with the thermosetting resin 12, a detailed explanation thereof will be omitted.

It is difficult to impregnate carbon fibers with a solid resin containing a fire-resistant resin, compared with glass fibers having hydroxyl groups on their surfaces. Furthermore, it is more difficult to impregnate fibers consisting of a larger number of elementary fibers, for example, a large tow that is a bundle of 30000 or more elementary fibers, with a solid resin containing a fire-resistant resin, compared with a regular tow that is a bundle of 3000 or more and 12000 or less elementary fibers. Therefore, it has conventionally been extremely difficult to impregnate carbon fibers with a solid resin containing a fire-resistant resin, and it has been even more extremely difficult to impregnate large-tow carbon fibers with a solid resin containing a fire-resistant resin. To address this issue, in this embodiment according to the present invention, the thermosetting resin 11 containing the long-chain fatty acid ester that functions excellently not only as a release agent but also as a viscosity depressant is selected as a raw material for the pultruded material manufacturing method for manufacturing the pultruded material 10, as described earlier. Therefore, the reinforced fibers 13 can be impregnated with the thermosetting resin 11 easily, even when the reinforced fibers 13 are carbon fibers, or when the reinforced fibers 13 are carbon fibers bundled into a large tow.

It is preferable for the reinforced fibers 13 to be carbon fibers. With such a configuration, when the reinforced fibers 13 are turned into the reinforced fibers 14 after being impregnated with the thermosetting resin 12, it is possible to improve the rigidity of the pultruded material 10. It is more preferable for the reinforced fibers 13 to be large-tow carbon fibers, and with such a configuration, the production cost can be reduced dramatically, compared with when regular tow carbon fibers are used.

Figure 2:
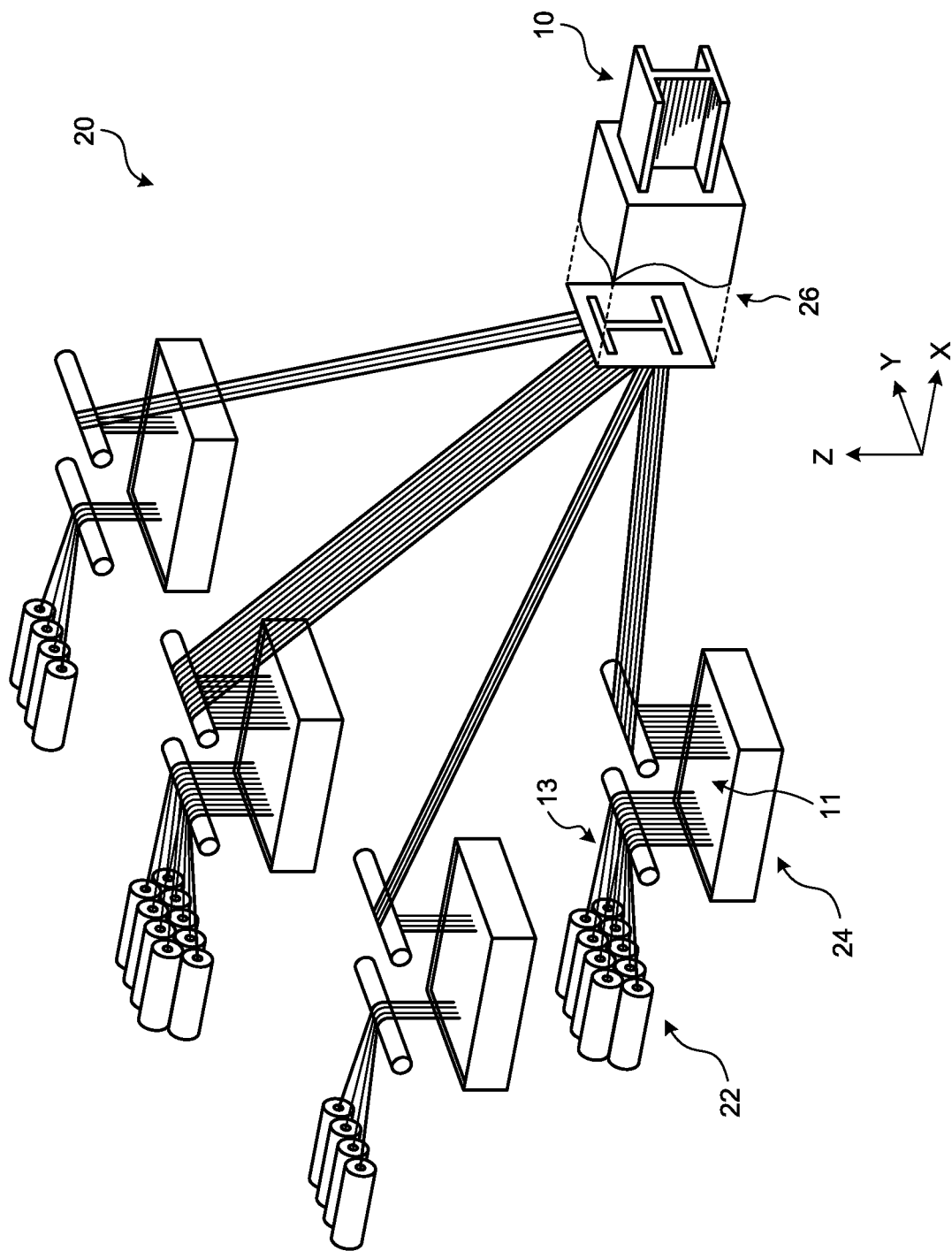
FIG. 2 is a schematic configuration diagram illustrating one example of a pultruded material manufacturing apparatus for manufacturing the pultruded material illustrated in FIG. 1.

FIG. 2 is a schematic configuration diagram illustrating one example of a pultruded material manufacturing apparatus 20 for manufacturing the pultruded material 10 illustrated in FIG. 1. The pultruded material manufacturing apparatus 20 includes, as illustrated in FIG. 2, a fiber feeding unit 22 that feeds the reinforced fibers 13, a resin pool 24 in which the reinforced fibers 13 are impregnated with the thermosetting resin 11, and the pultrusion die 26 that pultrudes the reinforced fibers 13 impregnated with the thermosetting resin 11, in a longitudinal direction that is the X-axis direction illustrated in FIG. 2.

The pultruded material manufacturing apparatus 20 includes the fiber feeding unit 22 and the resin pool 24 in a plurality of pairs, each corresponding to a part of the pultruded material 10, depending on the shape of the pultruded material 10. In the example illustrated in FIG. 2, the pultruded material manufacturing apparatus 20 includes four pairs of the fiber feeding units 22 and the resin pools 24, but the present invention is not limited thereto, and the pultruded material manufacturing apparatus 20 may include an appropriate number of pairs of the fiber feeding units 22 and the resin pools 24, depending on the shape of the pultruded material 10.

It is preferable for the fiber feeding unit 22 to feed a tow that is a bundle of a large number of elementary fibers as the reinforced fibers 13, and with this configuration, the structure of the fiber feeding unit 22 can be simplified, so that the production cost of the pultruded material 10 can be reduced dramatically.

It is preferable for a long-chain fatty acid ester having a high compatibility with and a high dispersibility in the solid resin to be used as the release agent and the viscosity depressant in the thermosetting resin 11 stored in the resin pool 24, and it is also preferable for the silica-based powder having a high dispersibility in the solid resin to be used as the thixotrope. With this composition, a stirring system facility for maintaining the dispersion in the thermosetting resin 11 can be simplified or omitted, so that the production cost of the pultruded material 10 can be reduced dramatically.

The pultrusion die 26 obtains the pultruded material 10 containing the thermosetting resin 12 and the reinforced fibers 14 impregnated with the thermosetting resin 12, and extended in the longitudinal direction that is the X-axis direction illustrated in FIG. 2, by pultruding the thermosetting resin 11 and the reinforced fibers 13 impregnated with the thermosetting resin 11 that are fed from the plurality of pairs of the fiber feeding units 22 and the resin pools 24, in the longitudinal direction.

The pultrusion die 26 includes a heater, and causes a thermal curing reaction of the thermosetting resin 11 with which the reinforced fibers 13 are impregnated. The heater in the pultrusion die 26 is provided around an outer circumferential portion of the pultrusion die 26, and preferably has a configuration in which the outer circumferential portion is heated using a heat source capable of keeping the temperature constant. With this configuration, the solid resin of the thermosetting resin 11 can be thermally cured while the temperature of the pultrusion die 26 is maintained. An example of the heat source capable of keeping the temperature constant includes heated fluid having a high heat capacity, and capable of covering the pultrusion die 26 while the heat source is kept in contact with the pultrusion die 26, and steam is preferably used. The heater may be provided between each of the resin pools 24 and the pultrusion die 26, and configured to heat the thermosetting resin 11 as appropriate.

Figure 3:
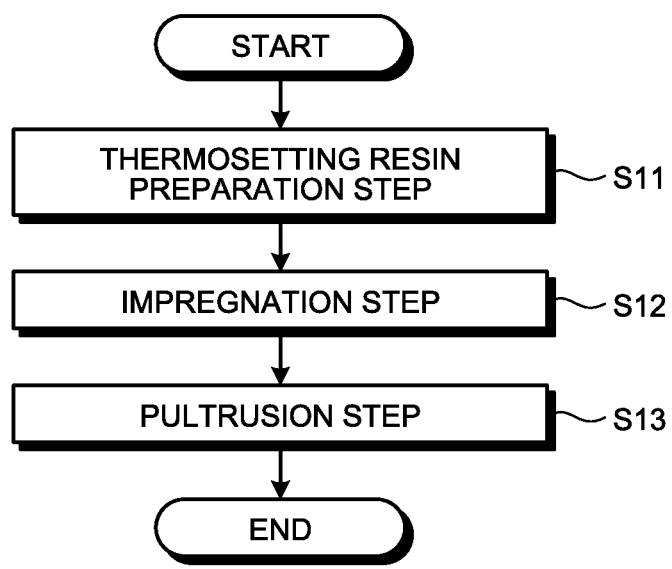
FIG. 3 is a flowchart illustrating one example of the sequence of a method for manufacturing a pultruded material according to the embodiment of the present invention.

FIG. 3 is a flowchart illustrating one example of the sequence of the method for manufacturing a pultruded material according to the embodiment of the present invention. The method for manufacturing a pultruded material according to the embodiment of the present invention that is performed by the pultruded material manufacturing apparatus 20 will now be explained with reference to FIG. 3. The method for manufacturing a pultruded material according to the embodiment of the present invention includes, as illustrated in FIG. 3, a thermosetting resin preparation step S11, an impregnation step S12, and a pultrusion step S13.

The thermosetting resin preparation step S11 is a step for preparing the thermosetting resin 11 containing: a solid resin that contains a fire-resistant resin having a median oxygen index within a range equal to or higher than 26; a long-chain fatty acid ester that has a median number of carbons per molecule within a range equal to or more than 3 and equal to or less than 1000, that has a median flash point within a range equal to or higher than 150 degrees Celsius, and that functions as a release agent giving the releasability from the pultrusion die 26 to the solid resin; and an additive that has a median BET specific surface area within a range equal to or more than 150 $m^2/g$ and equal to or less than 250 $m^2/g$, that has a median primary particle diameter within a range equal to or more than 5 nanometers and equal to or smaller than 20 nanometers, and that is a thixotrope that gives thixotropy to the solid resin; and a peroxide curing agent that has a median molecular weight within a range equal to or more than 170 and equal to or less than 10000, and that promotes a thermal curing reaction of the solid resin. Because prepared at the thermosetting resin preparation step S11 is the thermosetting resin 11 containing a release agent that gives the releasability from the pultrusion die 26 (see FIG. 2) to the solid resin, an additive that is a thixotrope that gives thixotropy to the solid resin, and a peroxide curing agent that promotes a thermal curing reaction of the solid resin, it is not necessary to add any antifoam or shrinkage reducing agent. Therefore, the thermosetting resin 11 can be prepared relatively easily.

The impregnation step S12 is a step for impregnating the reinforced fibers 13 with the thermosetting resin 11 prepared at the thermosetting resin preparation step S11. Specifically, at the impregnation step S12, the reinforced fibers 13 are impregnated with the thermosetting resin 11, by soaking the reinforced fibers 13 fed by the fiber feeding unit 22 in the resin pool 24 that stores therein the thermosetting resin 11.

The pultrusion step S13 is a step for forming the pultruded material 10 by pultruding the reinforced fibers 13 having been impregnated with the thermosetting resin 11 at the impregnation step S12, using the pultrusion die 26, in a direction in which the reinforced fibers 13 extend, that is, the direction in which the reinforced fibers 13 stretch. At the pultrusion step S13, it is preferable for the pultrusion die 26 to be heated using a heat source capable of keeping the temperature constant. With this configuration, even as the peroxide curing agent contained in the thermosetting resin 11 promotes a thermal curing reaction of the solid resin, the heat source capable of keeping the temperature constant can prevent a rapid increase of the temperature. Therefore, the solid resin of the thermosetting resin 11 can be thermally cured while maintaining the high quality. At the pultrusion step S13, the thermosetting resin 11 is turned into the thermosetting resin 12 by being subjected to a thermal curing reaction, and the reinforced fibers 13 are turned into the reinforced fibers 14, accordingly. As a result, the pultruded material 10 containing the reinforced fibers 14 impregnated with the thermosetting resin 12 is obtained.

With the pultruded material 10 and the method for manufacturing a pultruded material, because the long-chain fatty acid ester functions as a release agent giving the releasability from the pultrusion die 26 to the solid resin, and as a void reducing agent for reducing voids taking advantage of the low volatility of the long-chain fatty acid ester, and because the long-chain fatty acid ester functions as a viscosity depressant for reducing the viscosity of the solid resin, and because the additive functions as a thixotrope giving thixotropy to the solid resin, the pultruded material 10 containing a fire-resistant resin and achieving a sufficient rigidity level and cost level can be obtained. Furthermore, with the method for manufacturing a pultruded material, while the thermal curing reaction of the solid resin is obstructed due to the long-chain fatty acid ester and the additive added thereto, because the peroxide curing agent functions as a promoter of a thermal curing reaction of the solid resin, the speed of the thermal curing reaction is brought to an appropriate range. Therefore, the pultruded material 10 containing a fire-resistant resin and achieving a sufficient rigidity level and cost level can be obtained.

In the pultruded material 10 and the method for manufacturing a pultruded material, on the basis of the total mass (100 mass %) of the solid resin, the thermosetting resins 11, 12 contain the fire-resistant resin of 20 mass % or more and 70 mass % or less. With the pultruded material 10 and the method for manufacturing a pultruded material, even when the pultruded material 10 is manufactured by impregnating and pultruding the reinforced fibers 13 with the thermosetting resin 11 containing the fire-resistant resin at a high percentage, the functions of the long-chain fatty acid ester as a release agent, a void reducing agent, and a viscosity depressant, and the function of the additive as a thixotrope are exerted. Therefore, the pultruded material 10 containing a fire-resistant resin and further achieving a sufficient rigidity level and cost level can be obtained.

In the pultruded material 10 and the method for manufacturing a pultruded material, on the basis of the total mass (100 mass %) of the solid resin, the thermosetting resins 11, 12 contain the long-chain fatty acid ester of 0.5 mass % or more and 10.0 mass % or less. Therefore, with the pultruded material 10 and the method for manufacturing a pultruded material, the functions of the long-chain fatty acid ester as a release agent, a void reducing agent, and a viscosity depressant are exerted more effectively, in the manufacturing process in which the reinforced fibers 13 are impregnated and pultruded with the thermosetting resin 11 containing the fire-resistant resin. Therefore, the pultruded material 10 containing a fire-resistant resin and further achieving a sufficient rigidity level and cost level can be obtained.

In the pultruded material 10 and the method for manufacturing a pultruded material, a long-chain fatty acid having specifications satisfying requirements for a high molecular weight, a high flash point, and a low volatility is used as the long-chain fatty acid ester. Therefore, with the pultruded material 10 and the method for manufacturing a pultruded material, the functions of the long-chain fatty acid ester as a release agent, a void reducing agent, and a viscosity depressant, and the function of the additive as a thixotrope are exerted, in the manufacturing process in which the reinforced fibers 13 are impregnated and pultruded with the thermosetting resin 11 containing the fire-resistant resin. Therefore, the pultruded material 10 containing a fire-resistant resin and further achieving a sufficient rigidity level and cost level can be obtained.

In the pultruded material 10 and the method for manufacturing a pultruded material, on the basis of the total mass (100 mass %) of the solid resin, the thermosetting resins 11, 12 contain the additive of 0.01 mass % or more and 2.00 mass % or less. Therefore, with the pultruded material 10 and the method for manufacturing a pultruded material, the function of the additive as a thixotrope is exerted more effectively, in the manufacturing process in which the reinforced fibers 13 are impregnated and pultruded with the thermosetting resin 11 containing the fire-resistant resin. Therefore, the pultruded material 10 containing a fire-resistant resin and further achieving a sufficient rigidity level and cost level can be obtained.

In the pultruded material 10 and the method for manufacturing a pultruded material, silica-based powder is used as the additive. Therefore, in the pultruded material 10 and the method for manufacturing a pultruded material, the function of the additive as a thixotrope is exerted more effectively, in the manufacturing process in which the reinforced fibers 13 are impregnated and pultruded with the thermosetting resin 11 containing the fire-resistant resin. Therefore, the pultruded material 10 containing a fire-resistant resin and further achieving a sufficient rigidity level and cost level can be obtained.

In the pultruded material 10 and the method for manufacturing a pultruded material, the reinforced fibers 13, 14 are carbon fibers, and 30000 or more reinforced fibers are bundled into a large tow. Therefore, with the pultruded material 10 and the method for manufacturing a pultruded material, even when the pultruded material 10 is manufactured by impregnating and pultruding large tow carbon fibers that are difficult to be impregnated with a fire-resistant resin, with the thermosetting resin 11 containing the fire-resistant resin, the functions of the long-chain fatty acid ester as a release agent, a void reducing agent, and a viscosity depressant, and the function of the additive as a thixotrope are exerted. Therefore, it is possible to obtain the pultruded material 10 containing a fire-resistant resin, and further achieving a sufficient rigidity level and cost level, which are satisfied by the large tow of carbon fibers.

In the method for manufacturing a pultruded material, the thermosetting resin 11 contains, on the basis of the total mass (100 mass %) of the solid resin, a peroxide curing agent of 0.5 mass % or more and 5.0 mass % or less. Therefore, with the method for manufacturing a pultruded material, the peroxide curing agent functions as a promoter of a thermal curing reaction of the solid resin in the manufacturing process in which the reinforced fibers 13 are impregnated and pultruded with the thermosetting resin 11 containing the fire-resistant resin, while the thermal curing reaction of the solid resin is obstructed due to the long-chain fatty acid ester and the additive added thereto. Therefore, the speed of the thermal curing reaction is brought to an appropriate range, so that the pultruded material 10 containing a fire-resistant resin and achieving a sufficient rigidity level and cost level can be obtained.

In the method for manufacturing a pultruded material, a diacyl peroxide organic compound is used as the peroxide curing agent. Therefore, with the method for manufacturing a pultruded material, the peroxide curing agent functions as a promoter of a thermal curing reaction of the solid resin in the manufacturing process in which the reinforced fibers 13 are impregnated and pultruded with the thermosetting resin 11 containing the fire-resistant resin, while the thermal curing reaction of the solid resin is obstructed due to the long-chain fatty acid ester and the additive added thereto. Therefore, the speed of the thermal curing reaction is brought to an appropriate range, so that the pultruded material 10 containing a fire-resistant resin and achieving a sufficient rigidity level and cost level can be obtained.

At the pultrusion step S13 in the method for manufacturing a pultruded material, the pultrusion die 26 is heated using a heat source capable of keeping the temperature constant. Therefore, with the method for manufacturing a pultruded material, the solid resin is thermally cured while the temperature of the pultrusion die is maintained. Therefore, a pultruded material containing a fire-resistant resin and further achieving a sufficient rigidity level and cost level can be obtained.

EXAMPLES

The present invention will now be explained more specifically, with reference to the examples implemented in order to clarify the effects of the present invention. The examples described below are, however, not intended to limit the scope of the present invention in any way.

As the examples, 18 types of experiments, from Experiment 1 to Experiment 18, were carried out. For each of the 18 experiments from Experiment 1 to Experiment 18, conditions used in the experiment and an evaluation result related to the manufacture of the pultruded material 10 are summarized in Table 1. Because the material used in each of these experiments exhibits typical distributions in the molecular weight, the number of carbons per molecule, the flash point, the BET specific surface area, and the primary particle diameter, medians are indicated in Table 1 below, for the molecular weight, the number of carbons per molecule, the flash point, the BET specific surface area, and the primary particle diameter, and the medians of the molecular weight, the number of carbons per molecule, the flash point, the BET specific surface area, and the primary particle diameter will be mentioned as appropriate, in the explanation of the experiments.

TABLE 1

| | Thermosetting Resin | | | | | | | |
|---|---|---|---|---|---|---|---|---|
| | Solid Resin | | | | Release Agent | | | |
| | Percentage | Curing Agent | | | | # of | | |
| Exp. # | of Fire-resistant Resin [%] | Compound Series | Molecular Weight | Content by Percentage [mass %] | Compound Series | Carbons per Molecules | Flash Point [° C.] | Content by Percentage {mass %} |
| 1 | 20 | Peroxide-Based | 200 | 3.0 | Long-chain Fatty Acid Ester | 20 | 300 | 5.0 |
| 2 | 50 | Peroxide-Based | 200 | 3.0 | Long-chain Fatty Acid | 20 | 300 | 5.0 |
| 3 | 70 | Peroxide-Based | 200 | 3.0 | Long-chain Fatty Acid | 20 | 300 | 5.0 |
| 4 | 50 | Peroxide-Based | 200 | 3.0 | Long-chain Fatty Acid | 20 | 300 | 5.0 |
| 5 | 50 | UV curing agent | 200 | 3.0 | Long-chain Fatty Acid | 20 | 300 | 5.0 |
| 6 | 50 | Peroxide-Based | 200 | 3.0 | Long-chain Fatty Acid | 2 | 300 | 5.0 |
| 7 | 50 | Peroxide-Based | 200 | 3.0 | Long-chain Fatty Acid | 20 | 120 | 5.0 |
| 8 | 50 | Peroxide-Based | 200 | 3.0 | Long-chain Fatty Acid | 20 | 300 | 5.0 |
| 9 | 50 | Peroxide-Based | 200 | 3.0 | Long-chain Fatty Acid | 20 | 300 | 5.0 |
| 10 | 50 | Peroxide-Based | 200 | 3.0 | Long-chain Fatty Acid | 20 | 300 | 5.0 |
| 11 | 50 | Peroxide-Based | 200 | 3.0 | Long-chain Fatty Acid | 20 | 300 | 5.0 |
| 12 | 50 | Peroxide-Based | 200 | 0.3 | Long-chain Fatty Acid | 20 | 300 | 5.0 |
| 13 | 50 | Peroxide-Based | 200 | 10.0 | Long-chain Fatty Acid | 20 | 300 | 5.0 |
| 14 | 50 | Peroxide-Based | 200 | 3.0 | Long-chain Fatty Acid | 20 | 300 | 0.3 |
| 15 | 50 | Peroxide-Based | 200 | 3.0 | Long-chain Fatty Acid | 20 | 300 | 12.0 |
| 16 | 50 | Peroxide-Based | 200 | 3.0 | Long-chain Fatty Acid | 20 | 300 | 5.0 |
| 17 | 50 | Peroxide-Based | 200 | 3.0 | Long-chain Fatty Acid | 20 | 300 | 5.0 |
| 18 | 50 | Peroxide-Based | 200 | 3.0 | Long-chain Fatty Acid | 20 | 300 | 5.0 |

| | Thermosetting Resin Additive | | | | Pultruded Material | | | |
|---|---|---|---|---|---|---|---|---|
| Exp. # | Compound Series | BET Specific Surface Area [m²/g] | Primary Particle Diameter [nm] | Content by Percentage [mass %] | Surface Condition | Void | Fiber Volume Ratio | Pulling Force Stability |
| 1 | Silica-Based Powder | 200 | 15 | 1.00 | Good | Good | Good | Good |
| 2 | Silica-Based Powder | 200 | 15 | 1.00 | Good | Good | Good | Good |
| 3 | Silica-Based Powder | 200 | 15 | 1.00 | Good | Good | Good | Good |
| 4 | Silica-Based Powder | 200 | 15 | 1.00 | Ave. | Good | Good | Poor |
| 5 | Silica-Based Powder | 200 | 15 | 1.00 | Poor | Poor | Poor | Poor |

TABLE 1-continued

| | | | | | | | | |
|---|---|---|---|---|---|---|---|---|
| 6 | Silica-Based Powder | 200 | 15 | 1.00 | Poor | Poor | Poor | Poor |
| 7 | Silica-Based Powder | 200 | 15 | 1.00 | Poor | Poor | Poor | Poor |
| 8 | Silica-Based Powder | 135 | 15 | 1.00 | Poor | Good | Poor | Poor |
| 9 | Silica-Based Powder | 300 | 15 | 1.00 | Poor | Good | Poor | Poor |
| 10 | Silica-Based Powder | 200 | 3 | 1.00 | Poor | Good | Poor | Poor |
| 11 | Silica-Based Powder | 200 | 25 | 1.00 | Poor | Good | Poor | Poor |
| 12 | Silica-Based Powder | 200 | 15 | 1.00 | Ave. | Ave. | Ave. | Ave. |
| 13 | Silica-Based Powder | 200 | 15 | 1.00 | Ave. | Good | Good | Ave. |
| 14 | Silica-Based Powder | 200 | 15 | 1.00 | Ave. | Ave. | Ave. | Ave. |
| 15 | Silica-Based Powder | 200 | 15 | 1.00 | Ave. | Ave. | Ave. | Ave. |
| 16 | Silica-Based Powder | 200 | 15 | 0.005 | Ave. | Good | Ave. | Ave. |
| 17 | Silica-Based Powder | 200 | 15 | 2.30 | Ave. | Good | Ave. | Ave. |
| 18 | Calcium Carbonate-based Powder | 200 | 15 | 1.00 | Ave. | Good | Good | Ave. |

Experiment 1

As Experiment 1, the pultruded material 10 was manufactured following the sequence of the method for manufacturing a pultruded material described above, using the pultruded material manufacturing apparatus 20, and the thermosetting resin 11 and the reinforced fibers 13 having the compositions described below. Used as the thermosetting resin 11 was a thermosetting resin having a composition containing, on the basis of the total mass (100 mass %) of the solid resin, 20 mass % of the fire-resistant resin having a median oxygen index within a range equal to or higher than 26; 3.0 mass % of a peroxide curing agent having a median molecular weight of 200; and 5.0 mass % of a long-chain fatty acid ester, as a release agent, having a median number of carbons per molecule of 20, and having a median flash point of 300 degrees Celsius; and 1.00 mass % of silica-based powder, as an additive, having a median BET specific surface area of 200 m$^2$/g, and having a median primary particle diameter of 15 nanometers. Used as the reinforced fibers 13 was a large tow that is a bundle of 50000 carbon fibers that are elementary fibers.

In Experiment 1, four types of evaluations related to the manufacture of the pultruded material 10 were carried out. The first evaluation item was the surface condition of the manufactured pultruded material 10. The pultruded materials were evaluated into the following three ranks: "Good" indicating that the pultruded material had no gel attached thereto, and very little unevenness, and was at a level sufficiently usable as a product as it is; "Ave." indicating that there were some attachment of gel and unevenness, but was at a level sufficiently usable as a product by applying a slight surface treatment; and "Poor" indicating that the pultruded material had gel attached thereto and unevenness at levels equal to or higher than a certain level, and therefore, was not at a level usable as a product.

The second evaluation item was the void in the manufactured pultruded material 10, and the pultruded materials were evaluated into the following three ranks: "Good" indicating that the pultruded material had no obvious void, and was at a level sufficiently usable as a product as it is; "Ave." indicating that the pultruded material had some void, but was at a level usable as a product as it is; and "Poor" indicating that the pultruded material had voids at a level equal to or higher than a certain level, and therefore, was not at a level usable as a product.

The third item was the fiber volume ratio of the reinforced fibers 13 per unit per volume of the manufactured pultruded material 10, and the pultruded materials were evaluated into the following three ranks: "Good" indicating that the pultruded material had a sufficiently high density of the reinforced fibers 13, and was at a level sufficiently usable as a product with a high-level requirement; "Ave." indicating that the pultruded material had an approximately average density of the reinforced fibers 13, and was at a level usable as a product with an average-level requirement; and "Poor" indicating that the pultruded material had a low density of the reinforced fibers 13, and therefore, was not at a level usable as a product.

The fourth item was the pulling force stability of the pultruded material 10 when the pultruded material 10 was pulled out at a speed of 150 [mm/min] or so at the pultrusion step S13, and the pultruded materials were evaluated into the following three ranks: "Good" indicating that a change in the pulling force was sufficiently small, and the pultruded material was at a level at which the pultrusion step S13 can be carried out at a sufficient stability; "Ave." indicating that a change in the pulling force was at an approximately average level, and the pultruded material was at a level at which the pultrusion step S13 can be carried out under predetermined control; and "Poor" indicating that a change in the pulling force was drastic, so that it was difficult to carry out the pultrusion step S13 in a stable fashion.

In the Experiment 1, the evaluation result "Good" was achieved for all of the surface condition, the void, the fiber volume ratio, and the pulling force stability.

Experiment 2

In Experiment 2, the percentage of the fire-resistant resin content was changed from 20 mass %, which was used in Experiment 1, to 50 mass %. In Experiment 2, the evaluation result "Good" was achieved for all of the surface condition, the void, the fiber volume ratio, and the pulling force stability, in the same manner as in Experiment 1.

Experiment 3

In Experiment 3, the percentage of the fire-resistant resin content was changed from 50 mass %, which was used in Experiment 2, to 70 mass %. In Experiment 3, the evaluation result "Good" was achieved for all of the surface condition, the void, the fiber volume ratio, and the pulling force stability, in the same manner as in Experiment 2.

Experiment 4

In Experiment 4, the median molecular weight of the peroxide curing agent serving as a curing agent was changed from 200, which was used in Experiment 2, to 150. In Experiment 4, evaluation results "Ave.", "Good", "Good", and "Poor" were achieved for the surface condition, the void, the fiber volume ratio, and the pulling force stability, respectively, unlike those in Experiment 2.

Experiment 5

In Experiment 5, the compound series of the curing agent was changed from the peroxide curing agent, which was used in Experiment 2, to a UV curing agent. In Experiment 5, the evaluation result "Poor" was achieved for all of the surface condition, the void, the fiber volume ratio, and the pulling force stability, unlike those in Experiment 2.

Experiment 6

In Experiment 6, the compound series of the release agent was changed from the long-chain fatty acid ester, which was used in Experiment 2, to a fatty acid ester, and the median number of carbons per molecule was changed from 20 to 2. In Experiment 6, the evaluation result "Poor" was achieved for all of the surface condition, the void, the fiber volume ratio, and the pulling force stability, unlike those in Experiment 2.

Experiment 7

In Experiment 7, the median flash point of the long-chain fatty acid ester serving as a release agent was changed from 300, which was used in Experiment 2, to 120. In Experiment 7, the evaluation result "Poor" was achieved for all of the surface condition, the void, the fiber volume ratio, and the pulling force stability, unlike those in Experiment 2.

Experiment 8

In Experiment 8, the median BET specific surface area of the silica-based powder that is as an additive was changed from 200 $m^2/g$, which was used in Experiment 2, to 135 $m^2/g$. In Experiment 8, the evaluation results "Poor", "Good", "Poor", "Poor" were achieved for the surface condition, the void, the fiber volume ratio, and the pulling force stability, respectively, unlike those in Experiment 2.

Experiment 9

In Experiment 9, the median BET specific surface area of the silica-based powder that is the additive was changed from 200 $m^2/g$, which was used in Experiment 2, to 300 $m^2/g$. In Experiment 9, the evaluation results "Poor", "Good", "Poor", and "Poor" were achieved for the surface condition, the void, the fiber volume ratio, and the pulling force stability, respectively, unlike those in Experiment 2.

Experiment 10

In Experiment 10, the median primary particle diameter of the silica-based powder that is the additive was changed from 15 nanometers, which was used in Experiment 2, to 3 nanometers. In Experiment 10, the evaluation results "Poor", "Good", "Poor", and "Poor" were achieved for the surface condition, the void, the fiber volume ratio, and the pulling force stability, respectively, unlike those in Experiment 2.

Experiment 11

In Experiment 11, the median primary particle diameter of the silica-based powder that is the additive was changed from 15 nanometers, which was used in Experiment 2, to 25 nanometers. In Experiment 11, the evaluation results "Poor", "Good", "Poor", and "Poor" were achieved for the surface condition, the void, the fiber volume ratio, and the pulling force stability, respectively, unlike those in Experiment 2.

Experiment 12

In Experiment 12, the content percentage of the peroxide curing agent serving as a curing agent was changed from 3.0 mass %, which was used in Experiment 2, to 0.3 mass %. In Experiment 12, the evaluation result "Ave." was achieved for all of the surface condition, the void, the fiber volume ratio, and the pulling force stability, unlike those in Experiment 2.

Experiment 13

In Experiment 13, the content percentage of the peroxide curing agent serving as a curing agent was changed from 3.0 mass %, which was used in Experiment 2, to 10.0 mass %. In Experiment 12, the evaluation results "Ave.", "Good", "Good", and "Ave." were achieved for the surface condition, the void, the fiber volume ratio, and the pulling force stability, respectively, unlike those in Experiment 2.

Experiment 14

In Experiment 14, the content percentage of the long-chain fatty acid ester serving as a release agent was changed from 5.0 mass %, which was used in Experiment 2, to 0.3 mass %. In Experiment 14, the evaluation result "Ave." was achieved for all of the surface condition, the void, the fiber volume ratio, and the pulling force stability, unlike those in Experiment 2.

Experiment 15

In Experiment 15, the content percentage of the long-chain fatty acid ester serving as a release agent was changed from 5.0 mass %, which was used in Experiment 2, to 12.0 mass %. In Experiment 15, the evaluation result "Ave." was achieved for all of the surface condition, the void, the fiber volume ratio, and the pulling force stability, unlike those in Experiment 2.

Experiment 16

In Experiment 16, the content percentage of the silica-based powder that is an additive was changed from 1.00 mass %, which was used in Experiment 2, to 0.005 mass %. In Experiment 16, the evaluation results "Ave.", "Good", "Ave.", and "Ave." were achieved for the surface condition, the void, the fiber volume ratio, and the pulling force stability, respectively, unlike those in Experiment 2.

Experiment 17

In Experiment 17, the content percentage of the silica-based powder that is an additive was changed from 1.00 mass %, which was used in Experiment 2, to 2.30 mass %. In Experiment 17, the evaluation results "Ave.", "Good", "Ave.", and "Ave." were achieved for the surface condition, the void, the fiber volume ratio, and the pulling force stability, respectively, unlike those in Experiment 2.

Experiment 18

In Experiment 18, the compound series of the additive was changed from the silica-based powder, which was used in Experiment 2, to calcium carbonate-based powder. In Experiment 18, the evaluation results "Ave.", "Good", "Good", and "Ave." were achieved for the surface condition, the void, the fiber volume ratio, and the pulling force stability, respectively, unlike those in Experiment 2.

Based on these 18 types of experiments from Experiment 1 to Experiment 18, under a premise that fire-resistant resin is contained in the solid resin in the thermosetting resin 11, and a large tow that is a bundle of 50000 carbon fibers that are elementary fibers are used as the reinforced fibers 13, it is indicated that evaluation results higher than "Ave.", that is, evaluation results "Ave." or "Good" were achieved for all of the surface condition, the void, the fiber volume ratio, and the pulling force stability, when the pultruded material 10 is manufactured using thermosetting resin 11 containing: a long-chain fatty acid ester that has a median number of carbons per molecule within a range equal to or more than 3, and that has a median flash point within a range equal to or higher than 150 degrees Celsius; an additive that is a thixotrope, and that has a median BET specific surface area within a range equal to or more than 150 m$^2$/g and equal to or less than 250 m$^2$/g, and that has a median primary particle diameter within a range equal to or more than 5 nanometers and equal to or smaller than 20 nanometers; and a peroxide curing agent that promotes a thermal curing reaction of the solid resin, and that has a median molecular weight within a range equal to or more than 170.

Furthermore, based on these 18 types of experiments described above, it is indicated that it is more preferable, and that the evaluation result "Good" was achieved all of the surface condition, the void, the fiber volume ratio, and the pulling force stability, when the thermosetting resin 11 used in manufacturing the pultruded material 10 contains the long-chain fatty acid ester of 0.5 mass % or more and 10.0 mass % or less; contains the additive of 0.01 mass % or more and 2.00 mass % or less; and uses silica-based powder; and contains the peroxide curing agent of 0.5 mass % or more and 5.0 mass % or less.

REFERENCE SIGNS LIST

10 Pultruded material
11, 12 Thermosetting resin
13, 14 Reinforced fiber
20 Pultruded material manufacturing apparatus
22 Fiber feeding unit
24 Resin pool
26 Pultrusion die

The invention claimed is:

1. A pultruded material comprising:
a thermosetting resin; and
a reinforced fiber that is impregnated with the thermosetting resin, wherein
the thermosetting resin includes
a solid resin that contains a fire-resistant resin having a median oxygen index of equal to or higher than 26,
a long-chain fatty acid ester that has a median number of carbons per molecule within a range equal to or more than 3 and equal to or less than 1000, and that has a median flash point within a range equal to or higher than 150 degrees Celsius, and
an additive that has a median BET specific surface area within a range equal to or more than 150 m$^2$/g and equal to or less than 250 m$^2$/g, and that has a median primary particle diameter within a range equal to or more than 5 nanometers and equal to or smaller than 20 nanometers.

2. The pultruded material according to claim 1, wherein the thermosetting resin contains, on the basis of the total mass (100 mass %) of the solid resin, the fire-resistant resin of 20 mass % or more and 70 mass % or less.

3. The pultruded material according to claim 1, wherein the thermosetting resin contains, on the basis of the total mass (100 mass %) of the solid resin, the long-chain fatty acid ester of 0.5 mass % or more and 10.0 mass % or less.

4. The pultruded material according to claim 1, wherein the thermosetting resin contains, on the basis of the total mass (100 mass %) of the solid resin, the additive of 0.01 mass % or more and 2.00 mass % or less.

5. The pultruded material according to claim 1, wherein silica-based powder is used as the additive.

6. The pultruded material according to claim 1, wherein the reinforced fiber is a carbon fiber, and forms a large tow that is a bundle of 30000 or more carbon fibers.

7. A method for manufacturing a pultruded material resultant of impregnating a reinforced fiber with a thermosetting resin, the method comprising:
preparing the thermosetting resin;
impregnating the reinforced fiber with the thermosetting resin; and
pultruding, using a pultrusion die, the reinforced fiber impregnated with the thermosetting resin in a direction in which the reinforced fiber stretches to form a pultruded material, wherein
the prepared thermosetting resin includes
a solid resin that contains a fire-resistant resin having a median oxygen index of equal to or higher than 26,
a long-chain fatty acid ester that has a median number of carbons per molecule within a range equal to or more than 3 and equal to or less than 1000, that has a median flash point within a range equal to or higher than 150 degrees Celsius, and that serves as a release agent that gives releasability from the pultrusion die to the solid resin,
an additive that has a median BET specific surface area within a range equal to or more than 150 m$^2$/g and equal to or less than 250 m$^2$/g, that has a median primary particle diameter within a range equal to or more than 5 nanometers and equal to or smaller than 20 nanometers, and that serves as a thixotrope that gives thixotropy to the solid resin, and
a peroxide curing agent that has a median molecular weight within a range equal to or more than 170 and equal to or less than 10000, and that promotes a thermal curing reaction of the solid resin.

8. The method for manufacturing a pultruded material according to claim 7, wherein the thermosetting resin contains, on the basis of the total mass (100 mass %) of the solid resin, the peroxide curing agent of 0.5 mass % or more and 5.0 mass % or less.

9. The method for manufacturing a pultruded material according to claim 7, wherein a diacyl peroxide organic compound is used as the peroxide curing agent.

10. The method for manufacturing a pultruded material according to claim 7, wherein the pultruding includes heating the pultrusion die using a heat source capable of keeping a temperature constant.

* * * * *